United States Patent [19]

Chong et al.

[11] 4,131,514

[45] Dec. 26, 1978

[54] OXYGEN SEPARATION WITH MEMBRANES

[75] Inventors: Victor M. Chong, Media; Walter H. Seitzer, West Chester, both of Pa.

[73] Assignee: Sun Oil Company of Pennsylvania, Philadelphia, Pa.

[21] Appl. No.: 811,212

[22] Filed: Jun. 29, 1977

[51] Int. Cl.$^2$ ............................................... C25B 1/02
[52] U.S. Cl. .................................. 204/129; 204/195 S
[58] Field of Search .............. 204/129, 195 S, DIG. 3

[56] References Cited

U.S. PATENT DOCUMENTS

| | | | |
|---|---|---|---|
| 3,400,054 | 9/1968 | Ruka et al. | 204/195 S |
| 3,489,670 | 1/1970 | Maget | 204/129 |
| 3,650,934 | 3/1972 | Hickam et al. | 204/195 S |
| 3,888,749 | 6/1975 | Chong | 204/129 |

Primary Examiner—T. M. Tufariello
Attorney, Agent, or Firm—J. Edward Hess; Donald R. Johnson; Paul Lipsitz

[57] ABSTRACT

A process for separating oxygen from its admixture with other gases (e.g. air) by contacting one side of a solid electrolyte membrane in which ionic oxygen transport can occur with the oxygen-containing gas and separating essentially pure oxygen from the other side of the membrane.

6 Claims, 1 Drawing Figure

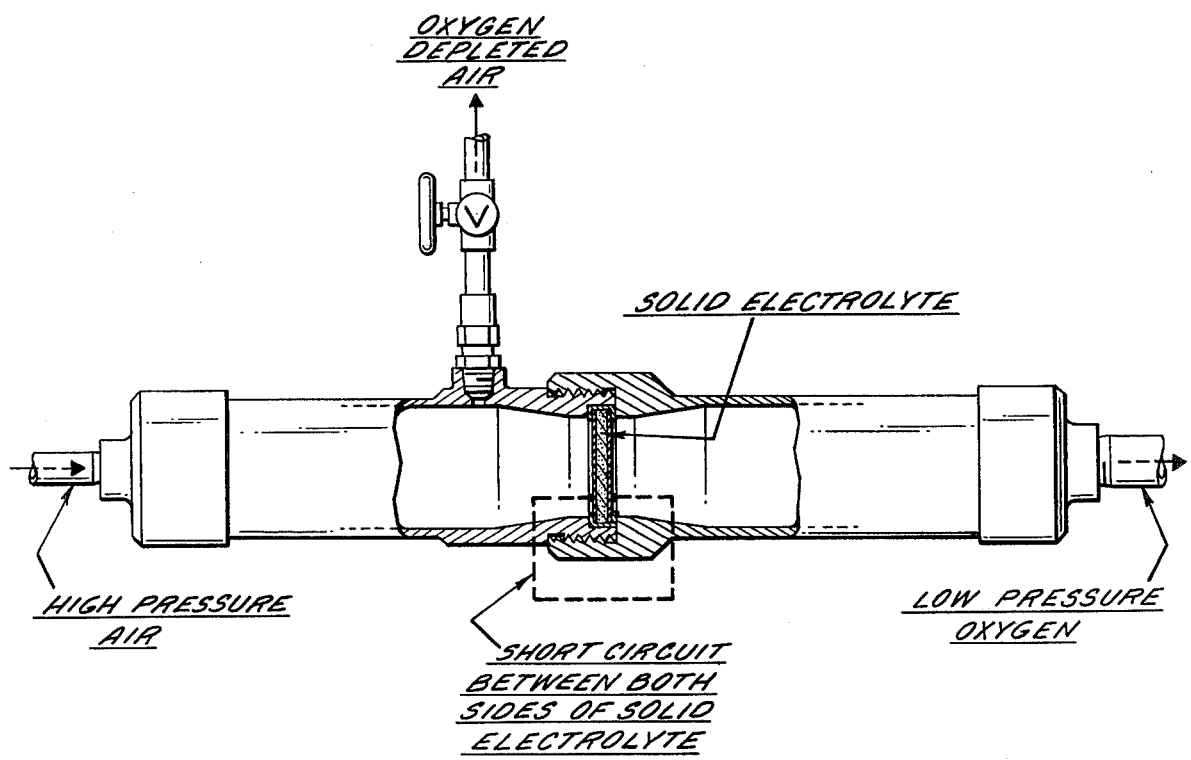

OXYGEN SEPARATION WITH MEMBRANES

It is known in the art to selectively pass molecular oxygen through a membrane in order to separate it from its admixture with other gases. Generally metal membranes such as silver and silver alloys have been used (U.S. 3,509,694) although inorganic refractory oxides such as zironia have also been disclosed (U.S. 3,901,669). Various organic membranes for separation from air have been surveyed by Lacey and Loeb in the text "Industrial Processing With Membranes" (Wiley-Interscience, 1972, pg. 326) and these authors state that at reasonable permeabilites the separation factor of oxygen over nitrogen is from 2.3 to 3.5 with little expectation of finding higher selectiveity. Since the diffusion through these membranes is molecular (i.e. oxygen molecules and nitrogen molecules), the opportunity for high selectivity is small because the molecular sizes of the elemental gases involved is not significantly different. Thus, membranes which function through molecular diffusion cannot achieve a very efficient separation of oxygen from nitrogen, $CO_2$, etc.

It is known to employ a liquid electrolyte to separate oxygen from air (U.S. 3,888,749) wherein the liquid electrolyte is mechanically pumped to maintain a pressure difference between the air and oxygen sides of an electrolytic cell. With such a system, ionic transport of oxygen occurs rather than molecular transport and this is a decided advantage in that it is specific to ionic oxygen and permits very high selectivity for oxygen separation. However, in the system of the prior art using a liquid electrolyte, the disadvantages of corrosion caused by the electrolyte and the energy required to mechanically pump the liquid through the cells detract from the efficiency of the system.

It is also known from the work of K.W.Browall and R.E. Hanneman on the GEZRO process for hydrogen production from coal or coal char (Preprints, Fuel Div. A.C.S., Vol. 20, No. 2., April 6-11, 1975) that the solid electrolyte membrane used in the process transports oxygen ionically and such ionic oxygen transport was used to effect the steam reforming reaction for hydrogen production. The membranes disclosed are those made of zirconia and promoted with certain oxide materials having a cation in the +2 and +3 oxidation state; e.g. Ca, Y, Sc, and others.

It has now been found that by use of an ionic transport system using a similar solid electrolyte, a superior process for separating oxygen from air and other gases is obtained. In such a system one side of the electrolyte is contacted with the oxygen-containing gas and only the oxygen is diffused through the membrane by ionic transport and then recovered on the other side of the membrane as molecular oxygen. The mechanical methods of contacting the solid electrolyte with air and removing oxygen from the other side may vary and will include (1) adjacent chambers separated by the electrolyte, (2) concentric tubes in which the central tube is the electrolyte, and the like.

In order to further describe the process of the invention reference is now made to the drawing of which illustrates a preferred, simple, but effective configuration for the cell which comprises a tubular reactor which is divided into two adjacent sections by the solid electrolyte. Although no external voltage is applied, a short circuit between the two sides of the electrolyte is established as shown to provide a complete circuit for the electron path. Air is introduced at one end under relatively high pressure contacts the electrolyte and ionic oxygen migrates through the electrolyte exiting as essentially pure oxygen at a lower pressure than that of the air input. The chamber into which the air enters contains an exit conduit for the oxygen depleted air and pressure may be controlled by a valve on the conduit as shown.

In principle, separation can be obtained at any temperature and can produce oxygen at any pressure, provided the partial pressure of oxygen on the air side of the membrane is higher than the total pressure on the pure oxygen side. For example, suppose the oxygen concentration on the air side was maintained at 20% (i.e., by maintaining a high throughput of fresh air, which is about 21% $O_2$). Maximum pure $O_2$ pressure would be 20% of the total air-side pressure. The rate of oxygen flow is proportional to the ratio of partial pressure of oxygen on the inlet side ($P_1$) to the oxygen partial pressure on the output side ($P_2$) and therefore it is preferred to operate at low pressure. For example, if $P_1$ is 1 atm. and $P_2$ is 0.1 atm., $P_1/P_2$ is 10, and $\Delta P$ is 0.9 atm. On the other hand if $P_1$ = 1000 atm. and $P_2$ = 100 atm. then $P_1/P_2$ = 10, but $\Delta P$ = 900 atm. across the membrane, which is beyond a practical limit. The process will generally be operated so that the pressure across the membrane is from about 0.1 to about 10 atm. Thus, the input air pressure will be from about 0.1 to about 12 atm.

Temperature is important in practice because most of the known membrane materials exhibit poor oxygen ion mobility at low temperature. Separation will always occur, but at rates too slow to be practical. Therefore, temperatures for the process must be elevated and be on the order of from about 100° C to about 2000° C, preferably from about 300° to about 1000° C.

Although the invention is not to be limited to any theory of operation, it is believed that the principles involved in the operation are as described hereinafter. The nitrogen in air is inert whereas the oxygen is active to a level which corresponds to its partial pressure and is capable of taking part in an electrode equilibrium of the following kind:

$$2 e^- + \tfrac{1}{2} O_2 + X^n \rightleftharpoons XO^{n-2} \qquad (1)$$

where,
X = electrolyte species
n = charge of electrolyte

In theory, when each side of such electrode is connected to provide a current flow, and differing oxygen partial pressure impinge on each side of the electrodes an emf is produced which flows from the low pressure side to the high pressure side. At the high pressure side, equation (1) proceeds left to right and oxygen from the air combines with the electrolyte which then becomes oxygen-rich. At the low pressure electrode, equation (1) proceeds right to left liberating oxygen from the electrolyte. A further discussion of this theory is found in U.S. 3,888,749 referred to above and hereby incorporated by reference. It should be noted that generally the electrode material is self-shorting because of the electrical conducting impurities present and for this reason an external short is not needed. Thus, the impurity centers in the electrode allow electrons to flow through the solid itself in accord with the following equation:

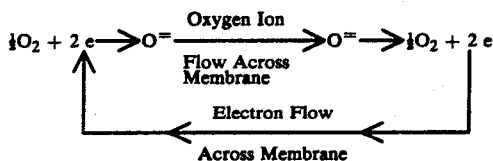

The solid electrolytes employed in the process of the invention may be selected from a number of ionic materials. The criteria for such agents will be that they exhibit good diffusion rates of oxygen ions, have sufficient electronic diffusivity to prevent polarization of the membrane, have a low permeability for gaseous air, especially nitrogen, and be non-porous. Examples of useful materials include the molybdates of bismuth, zinc and silver when used from about 400° to about 650° C. Also useful is zirconia doped with calcium, yttrium or scandium oxides to give electronic conductivity and used at 800 to 1000° C. The selectivities of these materials for oxygen over nitrogen are generally in excess of ten. The membranes will be made thin in order to provide a good rate of oxygen ion movement through them. Generally, the membranes will have a thickness on the order of twenty microns (say 5 to 50) and may be prepared by melting a powder of the desired membrane material on a porous backing in a manner analogous to the procedure described in the "1970 Final Report Project Fuel Cell", Research and Development Report No. 57, Prepared for Office of Coal Research.

It will be understood that the process is applicable to separation of oxygen from gases other than air. Accordingly, the invention provides a novel, economical and improved general method for oxygen separation from its admixture with other gases.

The invention claimed is:

1. A process for separating oxygen from its admixture with other gases which consists of pressuring at a temperature of from about 400° to about 650° C a first side of a solid electrolyte membrane selected from the group of molybdates of bismuth, zinc and silver in which ionic transport of oxygen can occur with said oxygen-containing gas, said membrane being provided with means for electron flow from said first side to the other second side, and separating essentially pure oxygen from the second side of said membrane at a total pressure which is lower than the partial pressure of oxygen on said first side.

2. A process for separating oxygen from its admixture with other gases which consists of pressuring one side of a solid electrolyte membrane selected from the group of molybdates of bismuth, zinc and silver provided with means for current flow from one side to the other and which membrane is capable of transporting ionic oxygen, with said oxygen containing gas at a pressure of from about 0.1 to about 12 atmosphere and at a temperature of from about 400° to about 650° C, and separating essentially pure oxygen from the other side of said membrane at a total pressure which is lower than the oxygen partial pressure of the oxygen-containing gas.

3. The process of claim 2 where the oxygen-containing gas is air.

4. The process of claim 3 where the solid electrolyte is comprised of bisumth molybdate.

5. The process of claim 3 where the solid electrolyte is comprised of zinc molybdate.

6. The process of claim 3 where the solid electrolyte is silver molybdate.

* * * * *